United States Patent [19]

Johnson et al.

[11] 3,747,872

[45] July 24, 1973

[54] TAPE TRANSPORT WITH CONSTANT TAKE-UP TENSION

[75] Inventors: Delmar R. Johnson, Barrington; Raymond J. Precin, Des Plaines, both of Ill.

[73] Assignee: Ampex Corporation, Redwood City, Calif.

[22] Filed: Nov. 26, 1971

[21] Appl. No.: 202,522

[52] U.S. Cl. .................... 242/206, 242/75.51, 318/7

[51] Int. Cl. ........................ B11b 15/32, G03b 1/04

[58] Field of Search ........................ 242/201–209, 67.4, 75, 75.1, 75.5, 75.51; 318/6, 7

[56] References Cited

UNITED STATES PATENTS

| | | | |
|---|---|---|---|
| 2,705,262 | 3/1955 | Post et al. | 242/201 |
| 3,104,071 | 9/1963 | Newberg | 242/203 |
| 3,117,262 | 1/1964 | Mullin | 318/7 |
| 3,203,636 | 8/1965 | Owen | 242/203 |

*Primary Examiner*—Leonard D. Christian
*Attorney*—William E. Anderson, Robert G. Clay et al.

[57] ABSTRACT

A tape transport for a magnetic tape recording and/or reproducing apparatus provides a substantially constant tape take-up tension for a magnetic tape traveling at substantially constant velocity to a take-up reel upon which the tape winds. This substantially constant take-up tension is achieved by substantially matching the torque and speed characteristics for the winding motor and for the take-up reel and by providing a transmission between the motor and the reel having a transmission ratio to provide a proportional change between its motor input and reel output to turn the reel at the desired velocites and with the desired torques.

5 Claims, 4 Drawing Figures

TAPE TRANSPORT WITH CONSTANT TAKE-UP TENSION

This invention relates to a magnetic tape recording and/or reproducing apparatus and more particularly to a tape transport and tape tensioning system for use therein.

Tape transports for magnetic tape recording and/or reproducing apparatus generally include supply and take-up reels with a length of tape extending between them. More specifically, the tape is threaded from the supply reel through a series of tape guides past a recording or reproduce head and about a capstan which pulls the tape under tension from the supply reel. The take-up reel is driven to maintain tension on the tape extending between the capstan and the take-up reel. Generally, there is a specific value of take-up tension for the take-up reel for a given tape transport which results in a minimum of capstan work and which assists the capstan in driving the tape at a substantially constant velocity. That is, ideally the change in tape tension across the capstan is reduced to zero for then all of the tape to capstan coupling force is available to isolate the effects of tape tension disturbance on tape velocity. To obtain such a constant tape tension, servo mechanisms for monitoring tape tension and for driving the take-up reel have been suggested and used heretofore in some instances.

Because of the additional expense in providing such a servo system to control the tape tension at the take-up reel, lower cost magnetic recording and/or reproducing apparatus have not used such servo systems for the take-up reel but have driven the take-up reel with a constant torque through a slip clutch drive to an electric winding motor. However, a constant torque applied to the take-up reel results in a significant decrease in take-up tension for the tape as the diameter of the coil of tape on the take-up reel increases and causes a larger moment arm between the take-up reel rotational axis and the point of tangency of the tape to the reel. The increase in moment arm is usually quite large, for example, the coil diameter usually doubles between a full reel and an empty reel and likewise the tape tension varies by a factor to two to one when a constant torque is applied to the take-up reel. Additionally in this above described apparatus, the take-up reel is necessarily driven at a rotational rate somewhat greater than that required to take-up the tape when the take-up reel is empty. When the take-up reel is full and a slower take-up reel rotation rate is required, the take-up reel drive rate is too great and causes a slip clutch to slip and the drive system to wear at an excessive rate.

Accordingly, a general object of the invention is to provide a new and improved tape transport system to provide a low cost and substantially constant take-up tension for magnetic tape at the take-up reel of a magnetic tape recording and/or reproducing apparatus.

Other objects and advantages of the invention will become apparent from the following detailed description taken in connection with the accompanying drawings in which.

Figure 1:
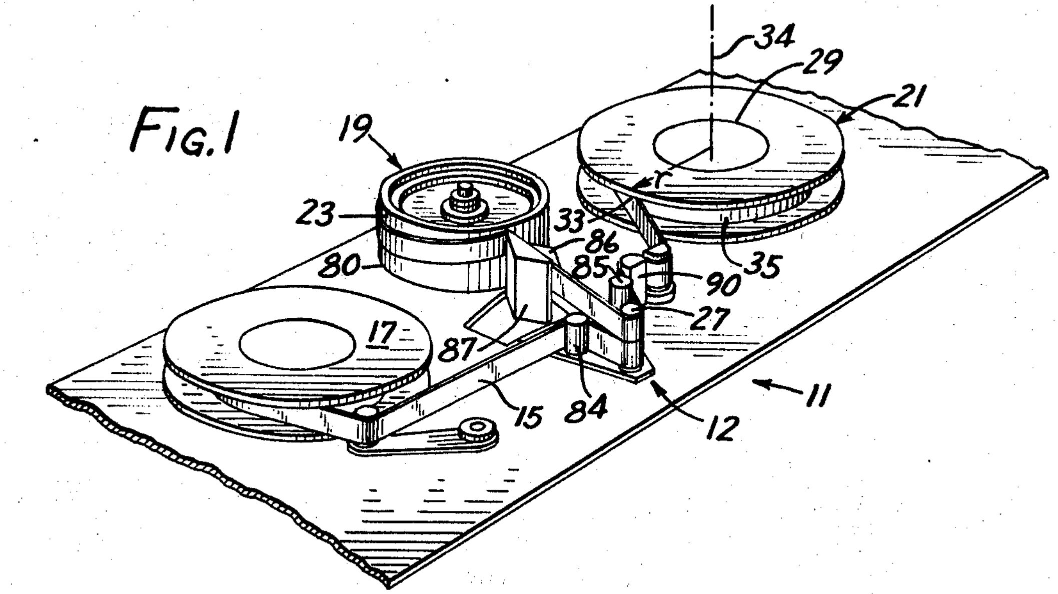
FIG. 1 is a diagrammatic perspective view of a magnetic tape recording and/or reproducing apparatus in which the present invention may be employed.

As shown in the drawings for the purposes of illustration, the invention is embodied in a magnetic tape reproducing and recording apparatus 11 having a tape transport 12 for transporting a magnetic tape 15 between a tape supply support means such as a supply reel 17 for travel past a scanning assembly 19 and to a take-up means in the form of a take-up reel 21. As will be described in detail, the illustrated apparatus 11 is a conventional video tape recorder in which the scanning assembly comprises an upper rotatable drum 23 carrying a magnetic transducing head (not shown) for engagement with the tape which is helically wrapped about the scanning assembly. The transducing head operates to record information on the tape or to reproduce electrical signals from information already recorded upon the tape. The tape is stripped from the supply reel 17 and transported through the scanning assembly by a capstan 27 and from the capstan the tape extends to wind about a hub 29 of the take-up reel 21.

The accuracy of timing information of the video signal is dependent upon maintaining accurate and stable tape dimensions and constant velocity of the tape. Relatively elaborate and expensive servo systems have been suggested and used to attempt to obtain a constant take-up tension, such systems are too expensive or elaborate for a low-cost apparatus of the kind illustrated. Heretofore, in a low-cost conventional video tape recorder apparatus of the kind described herein, the take-up reel was driven by a motor which provided a substantially constant take-up torque to the take-up reel. However, as magnetic tape 15 winds on the take-up reel hub 29, the winding radius increases, i.e., the distance between a point of tangency 33 of the tape 15 to an axis 34 for the take-up reel 21. With a constant torque and with the winding radius increasing with more tape wound on a coil or pack 35 of tape on the take-up reel, the tension in the tape decreased substantially from the original empty reel tension in the tape. For example, in the illustrated apparatus, the winding radius almost doubles from 2.25 inches for an empty reel to approximately 4.625 inches for a full reel. During this almost 2 to 1 increase in coil diameter on the take-up reel, the moment or winding radius also about doubles and the tape tension is halved.

Such substantial decreases in tape tension have an adverse effect on the ability of the capstan 27 to transport the tape 15 at a substantially constant velocity and with a minimum of work. That is, a substantial variation in take-up tension interferes with the capstan 27 and its ability to maintain a substantially constant velocity of tape transport past the scanning assembly 12. Also, the take-up tension controls the tightness or looseness of the coil winding in the tape pack 35. With a substantial decrease in tape tension during winding of tape upon the take-up reel, the inner coils of the tape coil are more tightly wound during the initial period of higher tension than in the later periods where the tape tension is significantly lower for winding of the outer windings of the tape pack 35.

In accordance with the present invention, the take-up tension in the length of magnetic tape 15 between the tape-up reel 21 and the capstan 27 is maintained at a constant value despite the very significant increase in diameter of the tape coil between the minimum winding radius and the maximum winding radius whereby a more constant velocity of tape transport is achieved for a magnetic tape reproducing and recording apparatus 11. This constant take-up tension for the magnetic tape is achieved by substantially matching the torque and speed characteristics for the winding motor 41 and for the take-up reel 21 between the initial winding radius position and the final winding radius position for the take-up reel 21. More specifically, the winding motor 41 torque-speed characteristic is selected to have an increasing torque output as its angular rotation rate is decreased, such a torque speed characteristic commonly results when a DC motor is driven from a constant voltage source. Then since tbe rotation rate of a take-up reel receiving tape moving at a constant velocity slows as the winding radius inceases, it is possible to build a substantially constant tension take-up system by choosing the proper gear ratio between the winding motor and take-up reel.

Referring now in greater detail to the illustrated embodiment of the invention, the transmission 39 is used to change, in this instance, to reduce the operating speed of the motor 41 to that desired for the take-up reel 21 and also acts to proportionally increase the motor torque to the torque value desired and applied to a take-up reel drive shaft 43. In this instance, the transmission 39 includes a driving pulley 45 secured to motor shaft 47 which is driven by the motor 41 for driving a belt 49 which extends to and is trained about a larger diameter driven pulley 51. Fixedly attached to the driven pully 51 is a coaxial driving wheel 53 of a given diameter for driving engagement with a cylindrical driven tire 57 secured on the periphery of a wheel 59 fastened to the take-up reel support shaft 43. Thus, it will be apparent that the motor 41 provides the torque and input speed at its output shaft 47 which are conveyed through the transmission 39 to the take-up reel drive shaft 43. The respective sizes of the pulleys 45 and 51 and drive wheels 53 and 59 determine the transmission ratio which, by way of example only, in the hereinafter described embodiment of the invention is a 10 to 1 decrease in speed with a 10 to 1 increase in torque.

When selecting a suitable transmission 39 and driving motor 41 to provide a constant take-up tension for the tape 15 being wound onto the take-up reel 21, the operational velocity of tape transport and the operational take-up tape tension and the amount of tape to be transported are known. For example, in the illustrated embodiment of the invention, the tape 15 is to be transported at an operational velocity of 9.6 inches per second (ips) for playback and/or recording and the tape take-up tension is to be maintained at 10 oz. With the take-up reel empty, the winding radius at the take-up hub 29 of the take-up reel is 2.25 inches and with the tape from the supply reel 17 fully wound on the take-up reel 21 the maximum winding radius is about 4.625 inches.

Torque equals tension multiplied by winding radius. Thus, the initial torque for the empty take-up reel should be equal to 10 oz. × 2.25 in. = 22.25 in. oz. and the maximum torque should be equal to 4.625 in. × 10 oz. = 46.25 in. oz. The initial reel angular velocity for winding the tape about the hub at a 2.25 inch wrapping radius for a tangential velocity of 9.6 ips can be calculated as follows:

$$9.6 \text{ ips}/4.5 \times \pi \times 60 \text{ sec./min.} = 40.8 \text{ rpm}$$

In a similar manner, the final reel angular velocity for winding the tape at a 4.625 inch wrapping radius for a tangential velocity of 9.6 ips can be calculated as follows:

$$9.6 \text{ ips}/9.25\ \pi \times 60 \text{ sec./min.} = 19.8 \text{ rpm}$$

Thus, it will be seen that in order to achieve constant take-up tension it is necessary that the take-up torque increase by a factor of 2:1 as the take-up reel rotation rate slows by a factor of 2:1.

Figure 3:
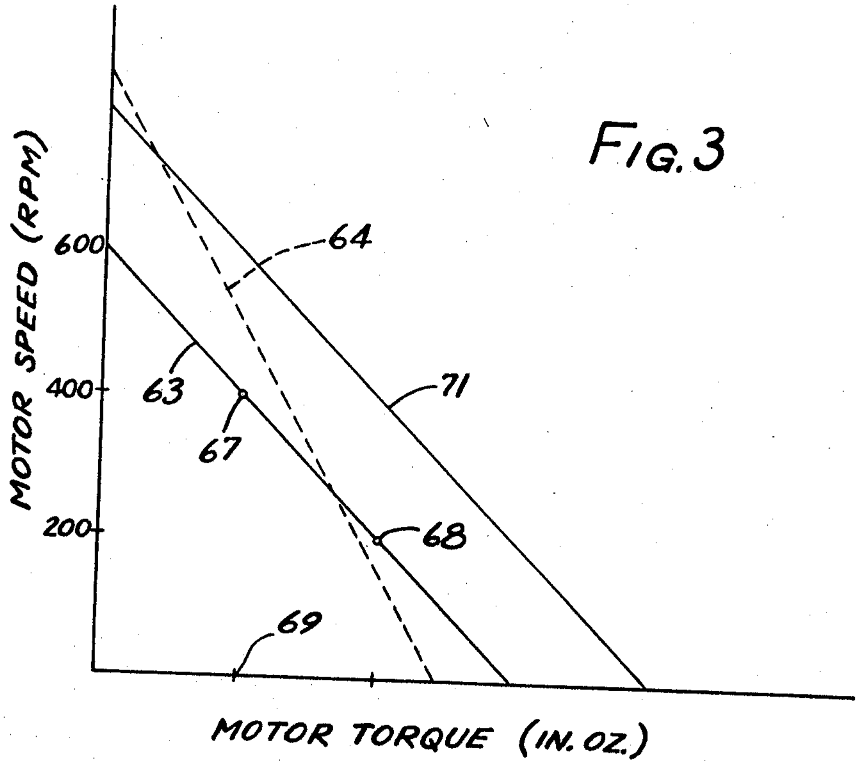
FIG. 3 is a diagrammatic illustration of the linear speed and torque characteristics for the preferred motor.

Typical torque speed curves of a DC motor are shown in FIG. 3. The following equation expresses the relationship between torque and rpm of such a motor for a specific supply voltage.

$T = C - KN$ where $T$ = Output torque $C$ = Stall torque (varies with applied voltage)

$K$ = Motor constant (dependent upon rotor winding, field strength)

$N$ = rpm

Thus, for a DC motor with a first rotor winding and field strength a torque speed characteristic is illustrated by line 64 whereas for a different DC motor having a different rotor winding and a different field strength the torque speed characteristic is illustrated by line 63. For a given DC motor having the torque speed characteristics illustrated by line 63 increases or decreases in applied voltage result in a series of parallel straight lines as represented by the line 71.

The DC motor 41 has a motor constant K, defined herein as the slope of a torque/speed characteristic line for a given voltage. In the illustrated example of the invention, the DC motor 41 has the torque/speed characteristic line 63 when a constant voltage of 29 volts is applied to the motor. With a proper combination of a motor torque/speed characteristic and a gear ratio, the torque/speed chaacteristics of the take-up reel 21 may be substantially matched.

Analyzing the torque/speed characteristic line 63, as illustrated in FIG. 3, the speed of the DC motor 41 may be reduced by one half from 400 rpm to 200 rpm, as shown by points 67 and 68 on line 63, while the torque doubles from 2.25 in. oz. to 4.50 in. oz. Having given a motor with a desired motor constant K, the gear ratio for the transmission 39 can be determined. The proper gear ratio to eliminate tape tension change between the beginning and end of reel for the above described apparatus can be calculated as follows:

$(T_{m2} - T_{m1})\ GR - T_{R2} - T_{R1}$ $(T_{m2} - T_{m1}) = K\ (N_{m1} - N_{m2}) = K\ (N_{R1} - N_{R2})\ GR$ $T_{m2}$ = Motor output torque when reel is full $T_{m1}$ = Motor output torque when reel is empty $GR$ = Gear Ratio $T_{R1}$ = Desired take-up torque when reel is empty = 22.25 in. oz.

$T_{R2}$ = Desired take-up torque when reel is full = 46.25 in. oz.

$K$ = Motor constant (From FIG. 3) = 4.5–2.25/400–200 = .01125 in. oz./rpm $N_{M1}$ — Motor rotation rate when reel is empty $N_{M2}$ — Motor rotation rate when reel is full $N_{R1}$ — Reel rotation rate when reel is empty = 40.8 rpm $N_{R2}$ — Reel rotation rate when reel is full = 19.8 rpm Substituting:

$(T_{M2} - T_{M1})\ GR = 46.25 - 22.25 = 24$ in. oz.

$(T_{M2} - T_{M1}) = .01125\ (40.8 - 19.8)\ GR = .236GR$ $.236\ GR^2 = 24$ $GR^2 = 101$ $GR = 10$

Thus, 10:1 is the proper gear ratio.

Figure 4:
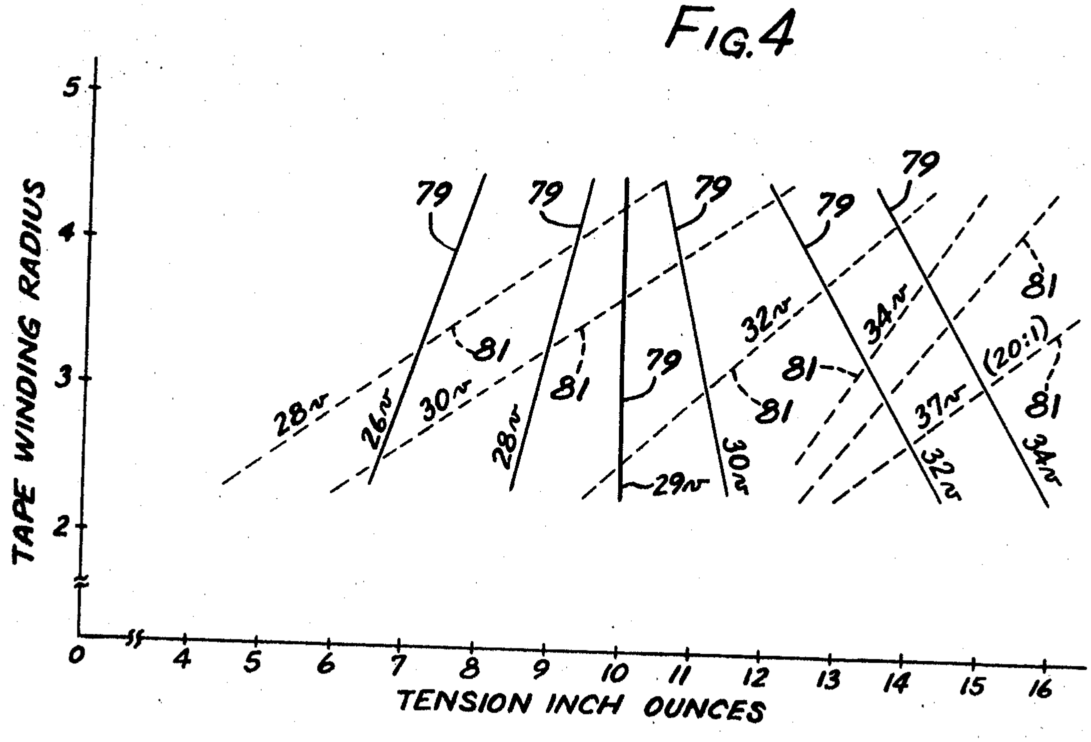
FIG. 4 is a diagrammatic illustration of plotting take-up tension against the tape pack radius.

The above results were confirmed in actual practice by measuring the take-up tension in the tape with change in pack diameter and recording the results, as illustrated in FIG. 4. Thus, it will be seen when the wind motor supply voltage is the specified 29 volts, curve 79 becomes close to a straight vertical line at the 10 ounce tension level. When the motor supply voltage is varied above and below 29 volts, the tape tension varies and is no longer constant with change in reel pack diameter.

Also, the effect of a 15 to 1 gear ratio is shown in curves 81 of FIG. 4. The changing slopes of the curves 81 for a 15 to 1 gear ratio indicate that a constant straight line tension would be in excess of 16 oz. of tension at a motor voltage in excess of 35 volts.

Because DC motor characteristics vary in practice from one motor to the next, it has been found desirable to provide an adjustable means 77 for controlling the motor to provide a fine adjustment. More particularly, the adjustable means 77 may be in the form of a potentiometer 78 which adjusts the voltage level slightly from the nominal voltage of 29 volts to match the torque speed characteristics of each motor to that of the motor 41 having the torque speed characteristic line 63.

In the illustrated embodiment of the invention, a fast wind may be accomplished without changing motor to reel gear ratio by providing a very significant increase in the voltage supplied to the motor 41 to cause it to operate at a much higher rate of speed. For example, the motor 41 was operated at 29 volts for play or record and at 130 volts for fast wind resulting in a fast wind tape speed approximately 15 times play speed.

Referring now in greater detail to the illustrated tape transport 12, it is one of several kinds which may be used and hence will only be briefly described. The length of the tape 15 extending between the reels 17 and 21 is wrapped helically about a lower drum 80 which is cylindrical and coaxial with the upper rotating drum 23 and together these drums comprise the scanning assembly 19. The lower drum 82 is fixedly supported on the tape deck and the upper drum 23 is mounted for rotation and is rotated at a very high speed by a drive motor (not shown) supported by the tape deck. The magnetic transducing head is mounted at a lower rim for the upper drum 23 and a tip thereon extends radially outwardly of the drum 23 and also of the drum 80 to engage the tape.

In order to facilitate driving and guidance of the tape helically about the scanning assembly 19, the tape driving capstan 27 is rotatably mounted on the deck in forward spaced, parallel relationship to the scanning assembly. Cylindrical entrance and exit guides 84 and 85, which are parallel to the axis to the capstan, are mounted on the deck between the capstan and scanning assembly and on opposite sides of a line extending between the scanning assembly and the capstan axis. In addition a pair of retractable tape guides 86 and 87 are slidably mounted on the deck on opposite sides of the line between the capstan and the scanning assembly axis at points between the guides 84 and 85 and the scanning assembly.

As shown in FIG. 1, the tape 15 leaving the supply reel 17 is engaged by the tape tension arm, extends about the first guide 84, extends around a lower portion of the capstan 27, about a downwardly tapered lowered half of the right hand or entrance guide 86 and tangentially upon the lower cylindrical drum 80 of the scanning assembly. By virtue, the shape of the entrance guide 86, the tape 15 is twisted slightly to slant the lower half thereof outwardly from the line between the capstan and the drum axis. This twist causes the tape entering the scanning assembly 19 to traverse in an upward path as it extends approximately 360° around the drums 23 and 80 to the exit guide 87. The tape 15 thus extends about the scanning assembly 19 in a helical path. The taper of the entrance guide 86 is selected moreover to impart a pitch to the helical path which positions substantially the entire width of the tape over the upper drum 23 at a point adjacent to the left hand or exit guide 87. The tape then tangentially leaves the upper drum 23 to extend around the left exit guide 87. The exiting tape extends around an upwardly tapered upper half of the exit guide around the upper portion of the capstan 27, about the fixed guide 85 and onto the take-up reel 21. The taper of the upper half of the exit guide 87 is equal, but opposite, to that of the entrance guide 86 such that the tape 15 is twisted to slant the upper edge thereof outwardly from a line between the drum and the capstan axis by an amount equal to the outward slant of the lower edge arising from the original twist effecting the helical path. Thus, the exiting tape is returned to a path lying in a plane parallel to the deck before it reaches the upper portion of the capstan 27 such that the tape extends uniformly about the capstan as directed uniformly upon the take-up reel 23 without kinking or twisting. As previously noted by virtue of the helical path, the tape 15 rises in passing around the drums 23 and 80 and it is for this reason that the take-up reel 21 is mounted in an elevated position on the raised portion of the deck. A tape timer 90 is disposed between the capstan and the take-up reel.

Although the guidance arrangement of the tape transports 12 illustrated in drawings herein described, it is such that it provides an Omega helical path about the scanning assembly 19, it is noted that this specific form of path is purely exemplary and that other helical paths extending 350° or more or substantially less than 360° may be employed with the invention by appropriate modification and tape guidance system. A 180° wrap may, for example, be employed with two heads mounted in diametrically opposite points at diametrically opposite points on a head drum or the principle for example may be applied to a longitudinal recorder that has no scanning assembly. In any event, the take-up tension may be kept substantially constant by the proper selection of a winding motor and transmission ratio to provide the take-up reel with the necessary rate of take-up torque increase as the winding radius increases.

Figure 2:
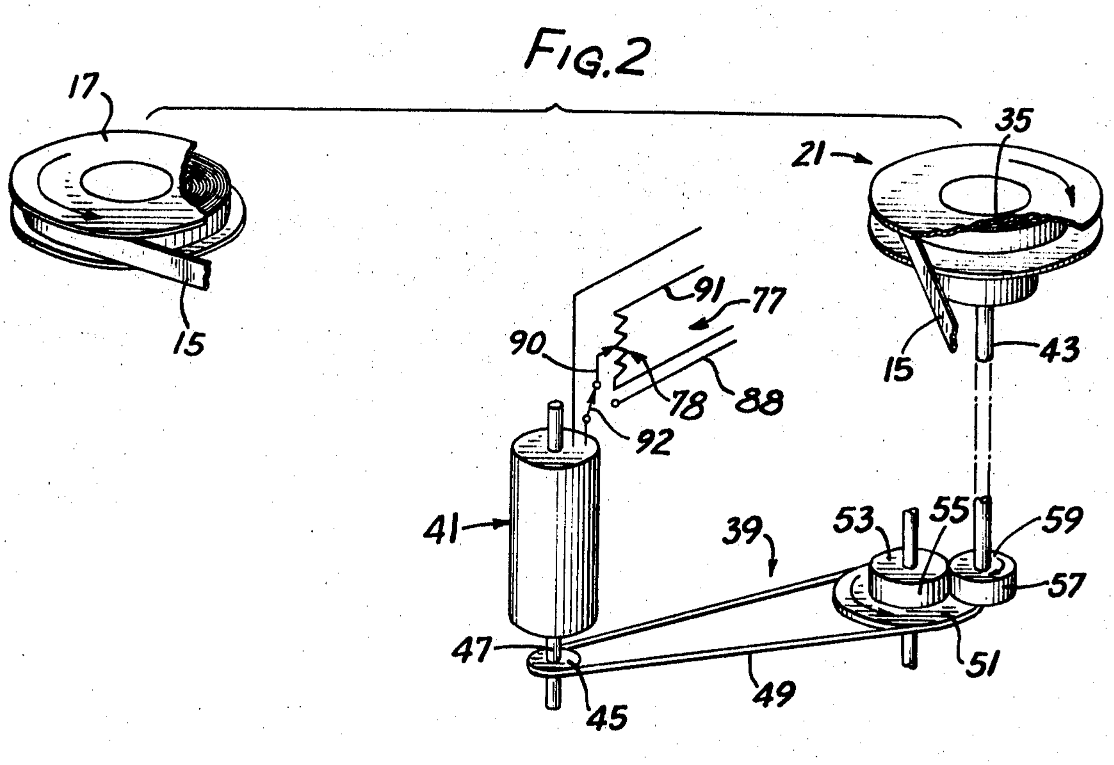
FIG. 2 is a diagrammatic illustration of a motor and a transmission for driving a take-up reel in accordance with the invention.

In the example of the invention described herein, the winding motor 41 is a permanent magnet, direct current motor sold under the trademark "23 Frame Indox Permanent Magnet Motor" by Indiana General Corporation of Oglesby, Ill., and is a rated 130 volt motor. The motor 41 is operated at 130 volts only for fast wind (or rewind) when switch contact swinger 92 (FIG. 2) is swung to establish contact with power lead 88. By swinging the switch contact swinger 92 to establish contact with lead 90 and power lead 91, a nominal 29 volts is applied to the motor 41 and the potentiometer 78 may be adjusted to provide the fine voltage adjustment from the 29 volts to obtain the substantially constant tension for the tape extending to and being wound on the take-up reel 21. It should be apparent that the present invention is not limited to this particularr motor or to the values given in the illustrated embodiment for the maximum and minimum winding radii or for the take-up tension for magnet tape as other magnetic tape recording and reproducing apparatus having other requirements may incorporate the invention therein.

From the foregoing, it will be seen that the torque speed characteristics needed for a constant tape tension at the take-up reel may be matched by the use of the torque speed characteristics of a selected electric winding motor and a transmission having a predetermined transmission ratio. A motor having a torque which varies inversely and linearly with speed may be coupled to a transmission to drive a reel with a predetermined and linear decrease in speed with a linear increase in torque. By applying a higher voltage to the motor, it may drive the reel at a significantly higher speed for fast tape transport during a fast winding or a fast rewinding operation. As the motor need not operate at the highest speed and through a slipping clutch for winding the tape at a normal operational speed encountered during recording or playback, the amount of wear in the transmission and clutch may also be reduced from that of the prior art. Thus, there is provided a low-cost manner of obtaining a substantially more constant take-up tension witb little extra cost as compared to the use of a servo system.

While a preferred embodiment has been shown and described, it will be understood that there is no intent to limit the invention by such disclosure but, rather, it is intended to modifications all modificantions and alternate constructions falling within the spirit and scope of the invention as defined in the appended claims.

What is claimed is:

1. A tape transport for transporting a magnetic tape at a constant speed and for maintaining a substantially constant and predetermined take-up tension for the magnetic tape in a recording and/or reproducing apparatus, said tape transport comprising support means for rotatably supporting a supply reel of magnetic tape, a take-up reel means for receiving tape extending from said supply reel, means for engaging the tape intermediate said supply reel and said take-up means and for acting on a length of tape extending to said take-up means to assist in tensioning the tape, an electric motor having a torque which varies inversely and linearly with speed at a predetermined rate when operated at a substantially constant voltage, and a transmission having a preselected transmission ratio coupled between said electric motor and said take-up reel means to change proportionally the torque and speed applied to the take-up reel to values at which said take-up tension remains substantially constant as tape is wound on said take-up reel means.

2. An apparatus in accordance with claim 1 in which said motor is operated in a second and significantly higher voltage to turn said take-up reel for a fast wind transport of said magnetic tape at a speed substantially higher than said constant speed.

3. An apparatus in accordance with claim 1 in which means are provided for adjusting the voltage of said motor from a nominal value to an adjacent actual value to compensate for motor characteristic variations.

4. An apparatus in accordance with claim 1 in which said transmission comprises a belt driven by said motor, a pulley driven by said belt, a drive wheel driven by said pulley, and a frictionally driven wheel driven by said drive wheel and connected to said take-up reel to turn the same.

5. A tape transport for transporting a magnetic tape at a constant speed and for maintaining a substantially constant and predetermined take-up tension for a video tape recording and/or reproducing apparatus, said tape transport comprising a supply reel for carrying a coil of magnetic tape, a take-up reel for receiving tape being transported from said supply reel and for winding the tape between a minimum winding radius position with said reel being substantially empty and a maximum winding radius position when substantially all the tape is wound on said take-up reel, a tape capstan engaging the tape intermediate said supply reel and said take-up reel and for driving said tape at a substantially constant speed for recording or reproducing, a length of tape extending from said capstan to said take-up reel means and receiving a predetermined take-up tension, an electric motor having a torque which varies inversely and linearly with speed when operated at a constant voltage, said electric motor being driven over a predetermined speed range and torque range when driving said take-up reel between said minimum and maximum winding positions, and a transmission having a preselected transmission ratio coupled between said electric motor and said take-up reel means to change proportionally the range of torque applied to the take-up reel from said motor and to change proportionally the speed at which said reel is rotated thereby, said ratio of change of speed and of torque for said reel being matched by the ratio of change of speed and of torque for said motor, said speed torque ratio for said reel at said constant speed providing a substantially constant take-up tension for said tape being wound on said take-up reel.

* * * * *

UNITED STATES PATENT OFFICE
CERTIFICATE OF CORRECTION

Patent No. 3,747,872 Dated July 24, 1973

Inventor(s) Delmar R. Johnson and Raymond J. Precin

It is certified that error appears in the above-identified patent and that said Letters Patent are hereby corrected as shown below:

Column 1, line 44, "to" (first occurrence) should read --of--.
Column 8, line 11, after "reel" insert --means--.
Column 8, line 22, after "reel" insert --means--.
Column 8, line 38, delete "means".
Column 8, line 47, delete "means".
Column 8, line 50, before "reel" insert --take-up--.
Column 8, line 51, before "reel" insert --take-up--.
Column 8, line 53, before "reel" insert --take-up--.

Signed and sealed this 14th day of May 1974.

(SEAL)
Attest:

EDWARD M.FLETCHER,JR.
Attesting Officer

C. MARSHALL DANN
Commissioner of Patents